May 15, 1945.  J. C. KREJCI  2,375,796
PROCESS OF MAKING CARBON BLACK
Filed Feb. 16, 1942
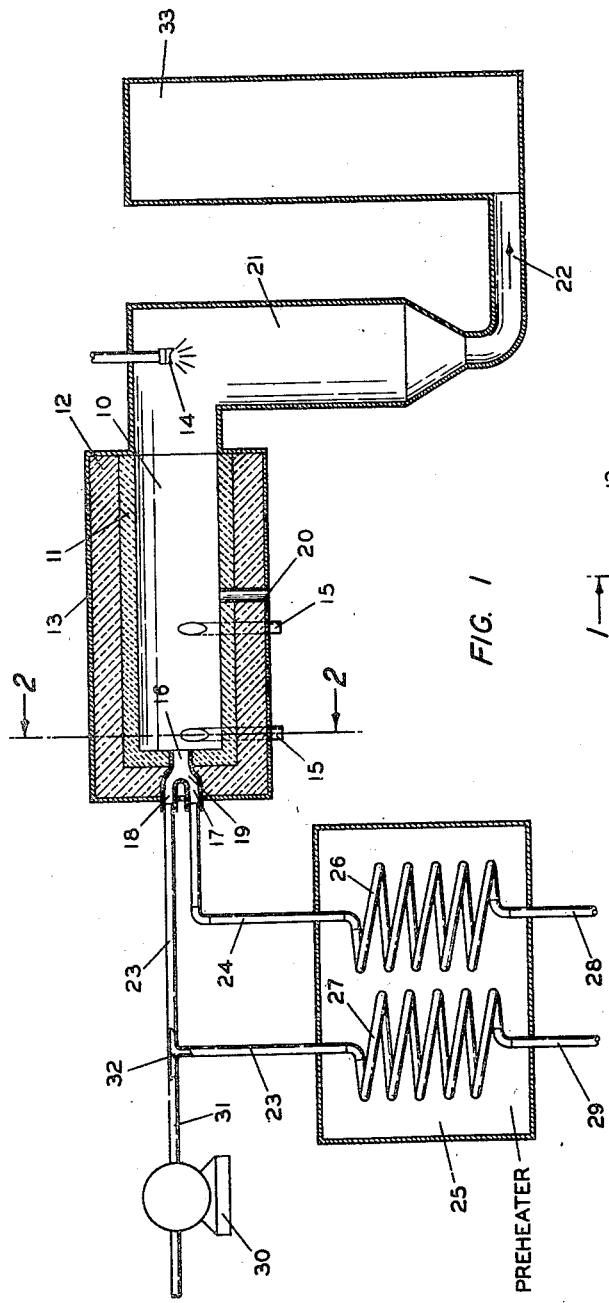
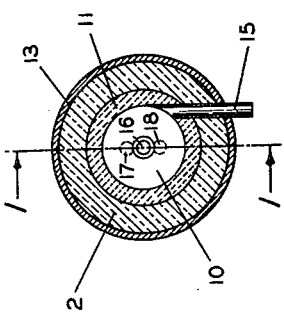
INVENTOR
JOSEPH C. KREJCI
BY
ATTORNEY Patented May 15, 1945

2,375,796

UNITED STATES PATENT OFFICE 2,375,796

PROCESS OF MAKING CARBON BLACK

Joseph C. Krejci, Kaw, Okla., assignor to Phillips Petroleum Company, a corporation of Delaware Application February 16, 1942, Serial No. 431,171

4 Claims. (Cl. 23—209.6)

This invention relates to a process for producing carbon black, and more particularly it relates to an apparatus and method for producing carbon black from liquid hydrocarbons by the incomplete combustion of carbonaceous gases and gasified liquid hydrocarbons or by decomposition thereof by contact with hot gases.

This application is a continuation-in-part of my co-pending application, Serial Number 424,084, filed December 22, 1941.

At the present time, most of the carbon blacks of commerce are produced by a very few processes and these blacks may be grouped into classes depending upon the types of rubber compound and vulcanized rubber which the carbon blacks will produce. A soft carbon black as compared to a hard carbon black is one which when mixed in a conventional rubber compound and then vulcanized yields a product which is softer, more resilient, more rubbery and yet tough whereas a hard carbon black in the same compound imparts stiffer, tougher characteristics, with lower resilience.

These two types of carbon black may be considered essentially as "limits" and many of the carbon blacks produced will possess hardness properties intermediate these above limits.

The commercial "channel" process produces a hard type carbon black which is especially good for compounding automotive tire tread stocks that withstand abrasion and possess good physical test properties. However, the yield of carbon by this process is only about 3.5% of the carbon content of the gas from which it is made. Some other carbon black processes give higher yields of carbon than the channel process, but in essentially all cases these blacks are of a softer type and less desirable for use in good quality tire tread stocks. These latter blacks, however, find other and varied uses, which are minor as compared to the relatively large amounts of hard channel black which go into tires at the present time and a process which would give a high yield of a hard black similar to channel black in properties, would be most desirable.

The principal object of this invention is to provide an apparatus and a process for producing carbon black of high yield and of quality comparable to or superior to the present day "channel black" for use in tire stocks.

Another object of this invention is to improve on the present day art of producing carbon black by providing an apparatus and a process which will produce carbon black out of contact with solid surfaces without depending on maintenance of streamline flow conditions as in some other processes, and with an extremely short reaction time.

A specific object of this invention is to provide a process and apparatus for the production of good quality carbon black from heavy hydrocarbons such as gas oil, and particularly from low grade oils which are low in cost at the present time.

Still another object of this invention is to provide a carbon black making process which is flexible in operation and especially in the respect that a product of essentially any desired properties ranging from those of the conventional soft carbon blacks, through the intermediate blacks, to the hard channel blacks, or even harder, can be produced with the same apparatus and raw materials merely by alteration and control of the operating conditions.

Still other objects and advantages will be apparent to those skilled in the art from a careful study of the following description and disclosure:

The accompanying diagrammatic drawing is a part of this specification and illustrates preferred forms of the apparatus for carrying out my invention, in which:

Figure 1 is a diagrammatic drawing of my apparatus showing a longitudinal section of a preferred form of the reaction chamber along the line 1—1 of Figure 2.

Figure 2 is a cross sectional view of the preferred form of the reaction chamber along the line 2—2 of Figure 1.

Like numerals on the several figures refer to the same or similar parts. This drawing has been presented in diagrammatic form only, and such conventional and well known parts as valves, flow meters, pressure regulators, temperature measuring devices, etc., for simplicity have not been shown.

Referring to the figures, the cylindrical reaction chamber 10 has a lining 11 of highly refractory material such as sillimanite or alundum. Between this refractory liner 11 and the cylindrical steel shell 13 is space 12 which is filled with insulating material. The chamber is equipped with one or more fuel burners 15 extending through the chamber wall and terminating in an oval shaped opening such that the incoming gaseous fuel mixture enters the reaction chamber tangential to the inside cylindrical surface of the chamber and perpendicular to the longitudinal axis thereof. The use of several tangential burners has been found advantageous under some conditions and provides for a more nearly uniform distribution of heat throughout the length of the chamber, and in addition, reduces the amount of fuel required to keep the chamber wall free of carbon. When two or more tangential burners 15 are used, it is not necessary that they be equal in size, since it has been found advantageous to introduce most of the tangential fuel through a large burner at the inlet end of the reaction chamber 10.

At the inlet end of the chamber 10 is inlet tube 16 which is in line with the longitudinal axis of the chamber. If one gas is admitted to the inlet end of the chamber, this tube 16 extends through the refractory, insulation and shell, but in case a mixture of two gases is admitted, a "Y" 19 is used, with tube 16 in this case, serving as a mixing tube as well as the chamber inlet tube. One arm 17 of said "Y" carries one of the gases, which in this embodiment is air and is termed reactant air, and the other arm 18 carries the other gas, termed reactant gas. The temperature within the chamber may be measured through one or more openings 20.

The ratio of the length to the diameter of the chamber has not been found to be critical, ratios ranging from 2 to 10 have been found to give good results. Two sizes of chamber have been used and found to give excellent results, the smaller four and one-half inches in diameter by twenty two inches long, and the larger one nine and one-half inches in diameter by forty six inches in length.

In the carrying out, or operating, according to my invention, a mixture of fuel such as natural gas and air is introduced through tangential burner or burners 15 at sufficient velocity to cause the flame to adhere to the inside surface of the chamber and form a blanket of flame and products of combustion over the chamber wall throughout its length. Velocities of the incoming gaseous mixture through the tangential burner ports may vary over wide limits, but must necessarily be rather high in case the gaseous fuel and air are mixed in explosive proportions. In this case, the rate of flow of this fuel must be faster than the linear rate of flame propagation in said fuel mixture to prevent an explosion. Applicant has found that this velocity of tangential gas flow may vary from as low as 30 feet per second or less to 200 feet per second, or even more. In one test, best results were obtained by maintaining this fuel gas velocity within the range of 100 to 150 feet per second. When air alone is used as the tangential gas, carbon is easily prevented from depositing on the chamber walls even at very low tangential velocities. Thus it is seen that the tangential gas may vary between wide limits of composition, ranging from air alone on the one hand to the theoretical mixture of combustible gas and air on the other hand, or even richer than the theoretical mixture provided the mixture is not so rich as to permit carbon deposition on the chamber side walls.

The tangential fuel velocity should be rather high to maintain by centrifugal force a layer or blanket of flame and combustion products on the inside of the chamber wall. The tangential flame and combustion products travel from the tangential burner inlet toward the outlet end of the reaction chamber 10 following a helical path adjacent the inside wall of said reaction chamber thereby forming essentially a continuous layer or blanket of flame and combustion products on said inside wall. This layer or blanket of flame serves as a separating medium to prevent contact of the central contents of the chamber and the side walls.

A hydrocarbon gas, herein referred to as "reactant gas," enters a preheating furnace 25 through pipe 29, is preheated in coil 27 and passes from the preheating furnace to the reaction chamber 10 through pipe 23. Another gas such as air, and herein referred to as "reactant air," enters the preheating furnace 25 through pipe 28, is heated in coil 26 and is carried on into the said reaction chamber by pipe 24. Reactant gas pipe 23 connects to the reactant gas inlet arm 18 of the Y 19, and reactant air pipe 24 connects to the reactant air arm 17 of the said Y. The heavy hydrocarbon or gas oil is injected into the preheated reactant gas stream at 32 by means of pump 30 and pipe 31.

The reaction chamber products exit from the open end of the chamber and are immediately cooled as by a water spray 14, in cooling chamber 21. The cooled products pass through the pipe 22 into the baghouse 33 or other carbon black collecting system in which the carbon black is separated from the gases.

A carbon bearing gas such as natural gas or a mixture of such gas and air with less than sufficient air for complete combustion is introduced through inlet tube 16 into the reaction chamber 10, the said carbon bearing gas and air having been previously heated in preheating furnace 25. If reactant air is not mixed with the incoming reactant gas at this point for furnishing endothermic heat to the reactants after they enter the reaction chamber, said heat of reaction is then supplied by the tangential flame. The tube 16 directs the reactants along the longitudinal axis of the chamber and this in addition to the effect of the tangential flame which keeps the reactant gas away from the walls of the chamber assures that the reaction to carbon takes place in the central core of the chamber. In operations when oxygen containing gas is mixed with the reactant gas and tube 16 serves as the mixer, it should be sufficiently large to mix them thoroughly and still not so large that the period of retention of the gaseous mixture in the tube is long enough to permit decomposition so extensive as to result in an inordinately rapid reduction of any portion of the reactant gas to carbon which would in turn accumulate in the tube.

Experiments in which the oxygen bearing gas was air, revealed that periods of detention of less than 0.005 second in the mixer were satisfactory, premature carbon deposition being virtually eliminated in many cases when both reactant gas and reactant air were preheated to a temperature of the order of 2000° F., the gas being a natural gas containing 35 pounds of carbon per 1000 cubic feet. The preheating furnace may be a tube furnace or other type of furnace or other heating means of suitable design and such that the gases undergoing preheating may be heated to temperatures within the range of say 1000° to 2800° F. or even more, and such that the heated gases issuing therefrom may be at a constant, predetermined temperature, so that the operation of my invention may be properly carried out. Experiments have been made in which the reactant gas and reactant air were admitted to the mixer at essentially atmospheric temperature, that is, without preheating. Carbon black yields were higher under these conditions than usually obtained in present day practice, but applicant prefers to preheat the reactant gases in order to obtain maximum yields of black.

In one experiment in which the same natural gas was used in the fuel to the tangential burner and as reactant gas, the minimum tangential fuel required to maintain the chamber wall free of carbon had 25 to 40 per cent as much natural gas as was used as reactant gas. The amount of tangential burner fuel required to prevent carbon deposition increased as the ratio of reactant air to reactant gas was decreased. In this above referred to experiment, the retention time in the chamber was approximately 0.1 second. While this particular retention time was held to about 0.1 second, it was found that the said retention time may be varied depending upon other conditions from 0.005 second to as long as 0.4 second, or even 1 second, and still obtain good quality-high yield carbon black. The temperature within the chamber may be varied within wide limits, as for example, the chamber temperature in the above referred to experiment was arbitrarily held within the range of 2000 to 3300° F., better yields of excellent quality hard black resulted from operating periods when temperatures were of the order of 2300 to 2600° F., however, high yields were obtained at chamber temperatures as high as 3100° F., and at temperatures lower than 2200° F. At all of the abovementioned temperatures and temperature ranges carbon black yields were higher than from the conventional channel process. These operating temperatures, retention time, etc., are not intended to be definite and limiting conditions, since experiments have indicated that operating conditions may be varied within wide limits and yet obtain extraordinarily high yields of carbon black of quality equal to or superior to the high quality channel black of commerce.

The herein disclosed tangential flame serves several purposes and its proper use makes possible continuous operation of my apparatus without deposition of carbon on the chamber walls. The reaction chamber must be maintained at a relatively high temperature to cause the carbon forming reaction to take place. By the introduction of a gas and air mixture through the tangential burners a sheet of flame covers the walls and the deposition of carbon thereupon is prevented by combustion and/or water gas reactions. Still more important, the tangentially fed gases covering the walls serve as a mechanical separator or partition to prevent contact of the reactant gases with the chamber sidewalls.

According to this invention one may increase the output of carbon black from a given reaction chamber over that produced when a natural or residue gas is used as the charge stock as disclosed in the above referred to co-pending application. Applicant has discovered that carbon black can be produced from such low grade and inexpensive material as "gas oil" by using the apparatus and method herein disclosed.

By the term "gas oil" applicant intends to include cracked oils as well as straight run oils. The straight run oils coming within applicant's definition of gas oils includes such fractions as those between the conventional illuminating oils and a fuel oil so heavy or of such a high boiling point that vaporization would not be complete upon injection into the preheated reactant gas stream. Cracked oils included within this category are such heavy oils as pressure distillate bottoms, and recycle type oils or even those heavy oils having little recycle value. These cracked oils, must of course, possess the same volatility characteristics as mentioned above.

The gas oil is atomized or injected as a fine stream or spray into the preheated reactant gas at point 32. The said reactant gas having been preheated to a temperature of 2000° F. or other temperature, as disclosed above, causes full and complete vaporization of the oil. Complete vaporization of the oil is conducive to the formation of small-particle carbon black, whereas, if the oil entered the reaction chamber 10 in the form of droplets, larger particles of black would result. Thus, the method, and point of addition of the oil are of primary importance. If the oil is added at point 32 as illustrated in Figure 1, the oil must have sufficient time in the preheated reactant gas tube to be vaporized completely. On the other hand, the time of residence must not be too long as this would lead to cracking of the heavy oil with resultant carbon deposition and plugging of the tube. Addition of an easily cracked oil to the reactant gas at the inlet end 29 of the preheat furnace would materially lower the temperature at which the furnace could be operated in order to prevent carbon formation within the heating coil 27. From these observations, it is apparent then that the preheat step plays a double role in my process and is definitely interrelated with the gas oil or heavy carbon containing oil addition step. In the apparatus embodiment of Figure 1, the preheat furnace not only preheats the reactant gas, but also furnishes the heat required for the vaporization of the gas oil, except for any vaporization which may take place in the inlet 16 in which case a part of the heat could be furnished by the preheated air or by partial combustion of the reactant gas in said tube 16.

Table I shows the operating data taken while manufacturing carbon black from natural gas (reactant gas) containing 35 pounds of carbon per thousand cubic feet and a recycle gas oil of 18.4° A. P. I. gravity when using my apparatus and according to my process as herein disclosed. The four experiments recorded were made using a reaction chamber of four and one-half inches inside diameter and twenty two inches inside length.

TABLE I

*Operating data*

[4½ by 22 inches reaction chamber]

| Run number | Preheat furnace, temp., °F. | Preheated reactants, cu. ft. per hr. | | Fuel to burners cu. ft. per hr. | | Gas oil, gals./1,000 cu. ft. reactant gas | Carbon black | |
|---|---|---|---|---|---|---|---|---|
| | | Gas | Air | Gas | Air | | Yield lbs./MCF reactant gas basis | Blending value of gas oil, lbs./gal. |
| B263 | 1,800 | 200 | 200 | 100 | 1,100 | 0 | 6.3 | |
| B271 | 1,800 | 200 | 200 | 100 | 1,210 | 1.57 | 14.2 | 5.0 |
| B267 | 1,800 | 200 | 300 | 70 | 770 | 0 | 6.5 | |
| B262 | 1,800 | 200 | 300 | 100 | 1,100 | 2.64 | 18.9 | 4.5 |

The second column headed "preheat furnace temperature" records the temperature to which the reactant gas and reactant air were heated in the preheating furnace. In column 8, headed "carbon black, yield, lbs./MCF reactant gas basis" are given the pounds yield of carbon black per 1000 cubic feet of reactant gas disregarding the feeding or time rate of feeding of the gas oil into the preheated reactant gas. The blending values for the gas oil were obtained by subtracting the yield of carbon black from the reactant gas alone in the blank experiments in which no gas oil was used from the yield from the reactant gas plus gas oil (column 8) and dividing the difference by the oil feed rate per 1000 cubic feet of reactant gas (column 7). In the case of runs B262 and B267, the fact that the tangential fuel rates were materially different was taken into account in calculating the blending values.

In all of the runs of Table I the amount of tangential fuel used was sufficient to keep the reaction chamber wall free of carbon. The addition of the oil to the reactants did not materially affect the amount of tangential fuel and reactant air required to produce a carbon black low in tarry materials. The yield of carbon black from the gas oil was very high averaging more than five pounds per gallon of oil. All the carbon blacks produced were low in the acetone extractable content, as may be seen in Table II. It might be mentioned, also, that while it is not necessary, the tangential burner fuel was composed of air and gas in the theoretical ratio for complete combustion to carbon dioxide and water.

One of the outstanding advantages of my process lies in the fact that although the yield of carbon black from the reactant gas and from the gas oil is exceptionally high, the quality is in most respects equal and in some respects superior for tire tread stock purposes to the excellent quality channel black. The channel black of commerce is used herein as standard of tire tread stock quality since black made by that process is acceptable to the tire manufacturers. To illustrate the quality of the carbon black made as herein disclosed and to compare its properties with those of channel black, batches of rubber compound were prepared using these blacks according to the following compounding formula:

| | Parts by weight |
|---|---|
| Smoke sheet | 100 |
| Carbon black | 50 |
| Zinc oxide | 5 |
| Sulfur | 3 |
| Stearic acid | 3 |
| Phenyl naphthylamine | 1 |
| Captax | 0.9 |
| Pine tar | 3 |

Compounds were made according to this formula containing the standard (channel) black and vulcanized at 274° F., while all the samples containing carbon black made according to my process were vulcanized at 260° F., the lower temperature being sufficient due to their more rapid vulcanizing properties. The stress-strain results of these rubber samples at various vulcanization times are given in Table II. The resilience in per cent of test pieces vulcanized for seventy minutes as measured by a Yerzley oscillograph and the acetone extractable content of the carbon black in per cent by weight are also recorded in the table.

By the term, "vulcanization" appearing in this specification is meant the length of time that the compound containing smoked sheet, carbon black, etc., is heated at the vulcanization temperature, and this time herein is recorded in minutes. The "500% modulus" column in the Table II refers to the pounds per square inch pull in a tension test when the test piece of vulcanized rubber has been stretched 500% of the length of the original test piece. The "break" column represents the pounds per square inch pull at the point of rupture or "break" of the test piece undergoing the abovementioned 500% modulus test. The elongation" column represents the stretch or "elongation" at the point of "break." The "resilience" is the complement of the hysteresis loss, or more simply expressed is a measure of the potential energy of a piece of rubber that is present as a result of applied stress and which is recoverable when the stress is removed. The "acetone extractable" is the per cent loss in weight of the original carbon black upon extraction with acetone.

TABLE II

*Rubber tests*

| Sample | Vulcanization at 260° F., minutes | Modulus, pounds per sq. inch, 500% | Break, pounds per square in. | Elongation, per cent | Resilience, per cent | Acetone extractable on original carbon black, per cent |
|---|---|---|---|---|---|---|
| B263 | 30 | 2,970 | 4,240 | 640 | 81.1 | .1 |
| B263 | 45 | 3,390 | 4,270 | 590 | | |
| B263 | 60 | 3,710 | 4,350 | 570 | | |
| B263 | 90 | 4,170 | 4,170 | 500 | | |
| B271 | 30 | 3,260 | 4,000 | 560 | 81.3 | 0 |
| B271 | 45 | 3,600 | 4,110 | 560 | | |
| B271 | 60 | 3,860 | 4,045 | 517 | | |
| B271 | 90 | | 4,000 | 460 | | |
| B267 | 30 | 2,875 | 4,380 | 650 | 79.0 | .13 |
| B267 | 45 | 3,580 | 4,385 | 580 | | |
| B267 | 60 | 3,660 | 4,425 | 580 | | |
| B262 | 30 | 3,300 | 4,050 | 585 | 84.6 | .15 |
| B262 | 45 | 3,770 | 4,060 | 535 | | |
| B262 | 60 | 4,000 | 4,285 | 530 | | |
| B262 | 90 | | 4,025 | 460 | | |
| Channel black: | (274° F.) | | | | | |
| Hard black | 30 | 2,275 | 4,150 | 700 | 74.8 | 0 |
| Do | 45 | 3,145 | 4,565 | 640 | | |
| Do | 90 | 3,640 | 4,475 | 582 | | |
| Channel black: | | | | | | |
| Hard black | 30 | 2,400 | 4,220 | 690 | 75.4 | |
| Do | 45 | 2,910 | 4,300 | 640 | | |
| Do | 60 | 3,385 | 4,390 | 620 | | |
| Do | 90 | 3,790 | 4,400 | 582 | | |

In addition to the tests on rubbers made with my carbon blacks, two samples are included in Table II containing conventional channel blacks for comparison.

Upon consideration of the data of Table II, it can be seen that the samples of carbon black made from the gas oil are substantially equal to and in some cases superior to channel black in regard to the modulus test. Most of the samples have breaking strengths of the order of 4000 pounds per square inch but somewhat below the channel black samples tested. One of the outstanding properties of applicant's blacks is their ability to impart to vulcanized rubber high modulus values and at the same time, high resilience values. In the case of the gas oil blacks, the modulus values are equal or superior to those of channel black while the resilience values approach those of the soft blacks of commerce. This combination of properties is extraordinary, as will be appreciated by those skilled in the art of rubber compounding, for high resilience values usually go hand-in-hand with low modulus values.

It may be observed that the samples vulcanized at 260° F. and having my carbon black incorporated therein possess very excellent properties for tire tread stocks when compared to the samples containing channel black and vulcanized at 274° F. This data also indicates that my black lends rapid vulcanizing properties to rubber compounds, and that these rubbers possess high modulus values along with high resilience.

Upon further consideration of this data of Table II, it is seen that certain of my blacks are adaptable for making the type of rubber ordinarily requiring a soft type black, the type of rubber requiring hard blacks and types requiring intermediate blacks. These several types of blacks were made in my apparatus and according to my process by certain and systematic variations of the operating conditions. One particular advantage of my process is that it is not limited to the making of one particular kind or type of carbon black, as are present day commercial processes, but in contrast is adaptable to the making of numerous types or kinds of blacks and these various kinds of carbon blacks may then be made to fit changing market, supply and demand conditions. In addition, another important advantage of my process is the very high yield of carbon black obtained from the reactant gas and from the gas oil, which high individual and combined yields is a definite step forward in the art of making carbon black as well as in the conservation of natural resources.

In Table I, the runs B263 and B267 were made on natural gas alone with carbon black yields of 6.3 and 6.5 pounds of black per 1000 cubic feet, and in terms of the percentage of the available carbon, based on 35 pound gas, these limits are 17.9% to 18.5%, and these values should be contrasted to the 2.5 to 3.0% yield of the widely used channel process. As reported in run B271 when 1.57 gallons of gas oil were added per 1000 cubic feet of the above natural gas, the total yield of black was increased to 14.2 lbs. When the yield of carbon from the gas is subtracted from the combined yield, or 14.2−6.3=7.9 pounds of black from the 1.57 gallons of gas oil, or 5.0 pounds of carbon black per gallon of gas oil. This amount of carbon black obviously represents a very high yield from the gas oil.

Relating to the apparatus or more particularly to the reaction chamber 10 as shown in the drawing, it is not intended to limit the chamber to the particular design as shown. The shape does not necessarily need to be cylindrical, but may be more oval in section or even rectangular to square. The tangential burners, in the case of small chamber, may be limited to one, or in larger chambers may be two or more, the number depending on the size of the chamber. When several burners are used, they can be distributed along the length of the chamber as shown in the figures, or they can be at the inlet end distributed around the circumference of the chamber. In this latter case, it may be desirable to give the fuel some velocity downstream with respect to the chamber by directing the burners at a slightly less angle than 90° to the longitudinally axis of the chamber. The burner ports can be of any shape such as round, oval or rectangular. A rectangular burner has an advantage over a round one in that a greater portion of the fuel stream enters tangentially with respect to the inside surface of the chamber, this being true in the case of burners with cross sections having a large ratio of length to width and with the longer dimension of the cross section parallel to the longitudinal axis of the chamber. In one embodiment, a large number of tangential openings may be provided in the lining of the chamber and supplied with fuel from an annular space surrounding the lining. In another embodiment, a single rectangular burner extending throughout the length of the chamber can be used.

The products issuing from the chamber 10 can be cooled by any conventional means, such as mixing with a cool inert gas such as nitrogen, or with a spray of water. The position of the point of introduction of the cooling gases or water spray depends on the desired time of exposure of the carbon product to the hot gaseous products of combustion from the tangential flame. If a separate quenching chamber is provided for each reaction chamber, it should preferably have about the same diameter as the chamber and have its axis in line with the axis of the reaction chamber. This arrangement permits the tangential flame to continue into the quenching chamber to keep the products in the central core from contacting solid surfaces until they are cooled.

Other gases than air can be used with the reactant fuel as well as with the tangential fuel, for example, oxygen enriched air or even oxygen alone.

As disclosed heretofore, my process is not limited to the use of natural gas as the carbon containing gas, while in addition to either dry gas, wet gas or raw gas as it comes from the well, or gasoline extraction plant or refinery residue gas, heavier hydrocarbons such as butane, or still heavier hydrocarbon products or fractions or even normally liquid hydrocarbons may be used, as for example, the gas oil previously disclosed. Oils heavier than the gas oil of commerce may be used as a source of carbon, as well as lighter oils, such as the kerosene fractions, heavy or light naphthas, or even the gasoline range of hydrocarbons. In addition, such materials as low temperature coal gas, coal tar distillates and oil shale gases and distillates may be used as charge stock to my process.

The air or gas, or both, in the fuel to the tangential burners can be preheated as a means of introducing more heat into the chamber. Fuel rich in air, or air alone, preferably preheated, can be used in any or all of the tangential burners.

Enriching the said fuel with air was found to reduce the fuel rate required to keep the chamber walls free of carbon. When air alone is used in the tangential burners, the product has a grayish color in comparison to the very black channel product, but the yield of carbon black is high. As desired, the fuel mixture to the tangential burners may be allowed to burn within the chamber or in a separate combustion chamber, the hot combustion gases then being conducted tangentially into said chamber. Since the functions of the tangential gases are to furnish heat to the chamber walls and to prevent deposition of carbon thereon, it is immaterial at what point the combustion takes place, as long as the gases reach the chamber walls in a properly heated condition.

One advantage of my process over the prior art lies in the fact that it makes possible the rapid conversion of hydrocarbons to carbon black out of contact with solid surfaces in extremely short reaction times and without depending on maintenance of streamline flow. I have verified that even under turbulent flow conditions a tangential layer of gas can be maintained to separate the wall and the gas occupying the central core of a cylindrical reaction chamber. The presence of a tangential gaseous layer may be readily demonstrated by producing a yellow flame in the central core and then introducing air through one or more tangential ports when a clear layer of air adjacent to the wall is visible. The thickness of this layer changes only little even if the amount of air introduced is two or three times the minimum required to establish the clear layer. This additional air over the minimum is apparently mixed with the reactant gas in the central core, and this fact is evidenced by the shortening of the yellow flame. If the air were introduced axially as a uniform layer next to the wall with a streamline flow in both the central flame and the air layer, a long diffusion flame results but a clear layer of air is maintained between the flame and the wall. However, as the velocities are increased into the turbulent flow range, the flame becomes shorter, the clear layer adjacent to the chamber walls disappears, and the flame is then in direct contact with the wall and carbon may be deposited thereon.

In my process, the operation at sufficiently high linear velocity of reactant gas as to give turbulent flow results in rapid transfer of heat into the moving body of reactant gas and decreases the time of reaction. This decreased times of reaction operates advantageously in my process since a much greater output of carbon black per chamber results, and a relatively large output of black per unit of chamber volume is characteristic of my reaction chamber and process of operation.

Operating under said turbulent flow conditions in the reactant gas stream has the advantage of making any given cross section of the stream normal to the direction of flow more nearly homogeneous with respect to states of decomposition, combustion and dilution. In contrast, a diffusion flame, characteristic of other carbon black making processes, is likely to have much tar and unreacted gas in the center, a surrounding layer of substantially decomposed gas carrying good quality carbon, and an outer layer of completely decomposed gas carrying overheated carbon.

When premixed fuel is used in the tangential burners, surface combustion on the chamber walls takes place thereby heating the walls to a very high temperature. These heated walls then heat the reactant gases by radiation. An appreciable part of this surface combustion goes to $CO_2$ and $H_2O$ and does not revert to $CO$ and $H_2$ because the carbon forming reactants do not mix completely with the combustion products and because the time at elevated temperature is too short.

The tangential flame also has the function of diluting the products, particularly in the latter part of the chamber. This dilution decreases the concentration of any undecomposed hydrocarbons and thus lessens the chance for carbon particle growth between the chamber and the point in the cooling system at which the products are cooled to a temperature below which no further reaction is possible.

Mixing of the reactant gas and the tangential flame within the chamber itself has been found to play an important role in my process. In addition to aiding in heat transfer, such mixing improves the quality of the product, as for example, the amount of acetone extractable matter in the carbon black is readily controlled by regulating the extent of this mixing, the greater the extent of mixing the less the acetone extractable.

Another advantage of this process over the prior art is its greater flexibility as to controlling the operation and as to control of the quality of product. The properties of the product can be varied over a wide range by adjusting the fuel rate to the tangential burner, the ratio of reactant air to reactant gas, gas and air preheat temperatures, reaction chamber temperature, and cooling of the chamber product, etc. Using my apparatus and the same raw materials, carbon black varying in properties from those of a soft "thermal decomposition" black to those of a hard channel black were produced.

The large increase in yield resulting from the addition of heavy hydrocarbons such as gas oil to the preheated reactants makes the yield per volume of gas handled in the process very high, and this gives the process the advantage of a low investment and operation cost per pound of carbon black produced.

This process is not limited to the use of gas oil or even liquid hydrocarbons. Any hydrocarbon above methane which can be advantageously added to the preheated reactants at the point and in the manner herein disclosed can be used. Volatilizable oils are preferable and most readily used in this process. In the case of oils with heavy residuum, fine atomization of the oil is advisable. Such materials as crude oil, well distillates, gasoline plant condensates, naphthas, kerosene, gasoline, and coal and shale distillates, can be used in this process. On the other hand, an unsaturated hydrocarbon as light as propylene, for example, can be used according to this process, if injected into the reactant gas following the preheat furnace, because this gas is easily cracked and its admixture with the reactant gas at the inlet end of the preheat furnace would definitely lower the temperature which could be used in the preheat furnace. Operation with a hydrocarbon such as propylene would be about the same as with gas oil except that the process of vaporization would not be involved unless the hydrocarbon would be maintained under substantial pressure up to the point of entrance into the system.

While chambers varying in diameter from four and one-half inches to nine and one-half inches have been successfully used, as disclosed heretofore, I do not wish to limit my apparatus to these sizes since other sizes both smaller and larger may be used. For chambers of large diameters and corresponding length, such as would be used in commerce, the optimum number and arrangement of tangential burners would need be determined.

Materials of construction, as for example, preheat furnace tubes, reaction chamber insulation and lining, etc., may be selected from among those items commercially available and best suited to the operating conditions as herein disclosed without departing from the scope of my invention.

While the preferred apparatus and method operation for carrying out my invention are described in this specification, it will be obvious to those skilled in the art that there may be many possible variations of the apparatus and methods of operation as may be learned from operating experience and yet remain within the intended spirit and scope of my invention, and limited only by the following claims.

I claim:

1. The continuous process of producing carbon black comprising vaporizing a gas oil in a stream of preheated reactant natural gas and adding a stream of preheated reactant air to form a reactant mixture, the amount of air being insufficient for complete combustion of the reactant natural gas and vaporized gas oil; continuously introducing this reactant mixture at a non-peripheral point at one end of an unobstructed reaction chamber having an inlet end wall and a generally cylindrical side wall and an open outlet end, the cross sectional area of the open outlet end being substantially the same as the cross sectional area of the cylindrical reaction chamber, the reaction mixture being introduced in a direction parallel to the longitudinal axis of the cylindrical reaction chamber; burning the mixture to maintain the temperature in the reaction chamber at the carbon black forming temperature; introducing a mixture of gaseous fuel and at least sufficiently oxygen containing gas for substantially complete combustion of said gaseous fuel into the reaction chamber near its inlet end wall through a burner port, said burner port being so positioned as to direct the flow of said gaseous fuel and oxygen containing gas in a direction tangent to the inner surface of the chamber side wall and essentially perpendicular to the longitudinal axis of said cylindrical chamber, the mixture of gaseous fuel and oxygen containing gas being introduced through said burner port at a sufficiently high velocity and in sufficient quantity as to maintain the flame and combustion products by centrifugal force adjacent the whole inner surface of the chamber side wall thus forming a separating layer of said flame and combustion products between the side wall and the reactant gas mixture in the reaction chamber, cooling the effluents of the reaction chamber to below the carbon black forming temperature and separating the carbon black from the products of combustion.

2. The continuous process of producing carbon black comprising heating a stream of reactant natural gas to a temperature within the range of 1000° to 2400° F., and heating a stream of reactant air to a temperature within the range of 1000° to 2400° F., vaporizing in the heated stream of reactant gas a gas oil to form a reactant hydrocarbon mixture, mixing the heated reactant hydrocarbon mixture and the preheated reactant air, the amount of air being insufficient for complete combustion of the heated reactant hydrocarbon mixture, and continuously introducing this reactant mixture at a non-peripheral point in the inlet end wall of an unobstructed reaction chamber having an inlet end wall and a generally cylindrical side wall and an open outlet end, the cross sectional area of the open outlet end being substantially the same as the cross sectional area of the cylindrical reaction chamber, the reactant mixture being introduced in a direction parallel to the longitudinal axis of the cylindrical chamber; burning the mixture to maintain the temperature in said reaction chamber between the limits of 2000° to 3300° F.; introducing a mixture of gaseous fuel and at least sufficient oxygen containing gas for substantially complete combustion of said gaseous fuel into the reaction chamber near the inlet end wall through a burner port, said burner port being so positioned as to direct the flow of said gaseous fuel and oxygen containing gas in a direction tangent to the inner surface of the chamber side wall and essentially perpendicular to the longitudinal axis of said cylindrical chamber, the mixture of gaseous fuel and oxygen containing gas being introduced through said burner port at a sufficiently high velocity and in sufficient quantity as to maintain the flame and combustion products by centrifugal force adjacent the whole inner surface of the chamber side wall thus forming a separating layer of said flame and combustion products between the side wall and the reactant gas mixture in the reaction chamber, cooling the effluents of the reaction chamber to below the carbon black forming temperature and separating the carbon black from the products of combustion.

3. The continuous process of producing carbon black comprising heating a stream of reactant natural gas to a temperature within the range of 1000° to 2400° F., and heating a stream of reactant air to a temperature within the range of 1000° to 2400° F., vaporizing in the heated stream of reactant gas a gas oil to form a reactant hydrocarbon mixture, mixing the heated reactant hydrocarbon mixture and the preheated reactant air, the amount of air being insufficient for complete combustion of the heated reactant hydrocarbon mixture, and continuously introducing this reactant mixture at a non-peripheral point in the inlet end wall of an unobstructed reaction chamber having an inlet end wall and a generally cylindrical side wall and an open ouelet end, the cross sectional area of the open outlet end being substantially the same as the cross sectional area of the cylindrical reaction chamber, the reactant mixture being introduced in a direction parallel to the longitudinal axis of the cylindrical chamber; and at such a velocity that the retention time therein will be less than one second; burning the mixture to maintain the temperature in said reaction chamber between the limits of 2000° to 3300° F.; introducing a mixture of gaseous fuel and at least sufficient oxygen containing gas for substantially complete combustion of said gaseous fuel into the reaction chamber near the inlet end wall through a burner port, said burner port being so positioned as to direct the flow of said gaseous fuel and oxygen containing gas in a direction tangent to the inner surface of the chamber side wall and essentially perpendicular to the longitudinal axis of said cylindrical chamber, the mixture of gaseous fuel and oxygen containing gas being introduced through said burner port at a sufficiently high velocity and in sufficient quantity as to maintain the flame and combustion products by centrifugal force adjacent the whole inner surface of the chamber side wall thus forming a separating layer of said flame and combustion products between the side wall and the reactant gas mixture in the reaction chamber, cooling the effluents of the reaction chamber to below the carbon black forming temperature and separating the carbon black from the products of combustion.

4. The continuous process of producing carbon black comprising vaporizing a gas-oil in a stream of preheated reactant natural gas to form a hydrocarbon mixture, continuously introducing the hydrocarbon mixture through the inlet wall of an unobstructed reaction chamber having an inlet end wall, a generally cylindrical side wall and an open outlet end, the cross sectional area of the open outlet end being substantially the same as the cross sectional area of the reaction chamber, the hydrocarbon mixture being introduced in a direction parallel to the longitudinal axis of the cylindrical reaction chamber; introducing an oxygen-containing gas into the reaction chamber near the inlet end wall through a burner port, said burner port being positioned to direct the flow of said oxygen-containing gas in a direction tangent to the inner surface of the chamber side wall and essentially perpendicular to the longitudinal axis of said cylindrical chamber, the oxygen-containing gas mixing with a portion of the hydrocarbon mixture to form a combustible mixture, said oxygen-containing gas being present in the reaction chamber in insufficient quantity for complete combustion, burning the combustible mixture to maintain the temperature in the reaction chamber at the carbon black forming temperature, the oxygen-containing gas being introduced through said burner port at a sufficiently high velocity and in sufficient quantity to maintain the flame and combustion products by centrifugal force adjacent the whole inner surface of the chamber side wall thus forming a separating layer of said flame and combustion products between the side wall and the hydrocarbon mixture in the reaction chamber, cooling the effluents of the reaction chamber to below the carbon black forming temperature and separating the carbon black from the products of combustion.

JOSEPH C. KREJCI.